(12) United States Patent
Kang et al.

(10) Patent No.: US 8,786,976 B1
(45) Date of Patent: Jul. 22, 2014

(54) DISK DRIVE DETECTING WHEN HEAD IS ON RAMP

(75) Inventors: Soo-Choon Kang, Irvine, CA (US); Siri S. Weerasooriya, Campbell, CA (US); Scott A. Ottele, Longmont, CO (US)

(73) Assignee: Western Digital Technologies, Inc., Irvine, CA (US)

( * ) Notice: Subject to any disclaimer, the term of this patent is extended or adjusted under 35 U.S.C. 154(b) by 282 days.

(21) Appl. No.: 13/237,727

(22) Filed: Sep. 20, 2011

(51) Int. Cl.
 *G11B 21/02* (2006.01)
(52) U.S. Cl.
 USPC .................................. 360/75; 360/31; 360/25
(58) Field of Classification Search
 USPC ........ 360/75, 69, 31, 25, 77.03, 78.04, 78.14, 360/55
 See application file for complete search history.

(56) References Cited

U.S. PATENT DOCUMENTS

| | | | |
|---|---|---|---|
| 4,321,517 A | 3/1982 | Touchton et al. | |
| 4,532,802 A | 8/1985 | Yeack-Scranton et al. | |
| 4,691,152 A | 9/1987 | Ell et al. | |
| 5,075,805 A | 12/1991 | Peddle et al. | |
| 5,384,675 A | 1/1995 | Crawforth et al. | |
| 5,455,723 A | 10/1995 | Boutaghou et al. | |
| 5,485,323 A | 1/1996 | Anderson et al. | |
| 5,559,648 A | 9/1996 | Hunter et al. | |
| 5,576,906 A | 11/1996 | Fisher et al. | |
| 5,668,679 A | 9/1997 | Swearingen et al. | |
| 5,754,353 A | 5/1998 | Behrens et al. | |
| 5,761,212 A | 6/1998 | Foland, Jr. et al. | |
| 5,781,363 A | 7/1998 | Rowan et al. | |
| 5,831,888 A | 11/1998 | Glover | |
| 5,973,870 A | 10/1999 | Boutaghou et al. | |
| 6,000,282 A | 12/1999 | Ku et al. | |
| 6,021,012 A | 2/2000 | Bang | |
| 6,023,386 A | 2/2000 | Reed et al. | |
| 6,091,564 A | 7/2000 | Codilian et al. | |
| 6,092,412 A | 7/2000 | Flechsig et al. | |
| 6,249,896 B1 | 6/2001 | Ho et al. | |
| 6,292,318 B1 | 9/2001 | Hayashi | |
| 6,304,407 B1 | 10/2001 | Baker et al. | |
| 6,411,453 B1 | 6/2002 | Chainer et al. | |
| 6,429,989 B1 | 8/2002 | Schultz et al. | |
| 6,507,450 B1 | 1/2003 | Elliott | |
| 6,519,107 B1 | 2/2003 | Ehrlich et al. | |
| 6,549,377 B2 * | 4/2003 | Yoshida et al. | ............ 360/254.3 |
| 6,563,660 B1 | 5/2003 | Hirano et al. | |
| 6,587,293 B1 | 7/2003 | Ding et al. | |
| 6,590,732 B2 | 7/2003 | Kitagawa et al. | |
| 6,603,622 B1 | 8/2003 | Christiansen et al. | |
| 6,636,377 B1 | 10/2003 | Yu et al. | |
| 6,643,088 B1 | 11/2003 | Kawachi | |
| 6,700,726 B1 * | 3/2004 | Gillis et al. | ..................... 360/75 |
| 6,704,156 B1 | 3/2004 | Baker et al. | |

(Continued)

OTHER PUBLICATIONS

U.S. Appl. No. 11/760,601, filed Jun. 8, 2007, 24 pages.

(Continued)

*Primary Examiner* — Ali Neyzari

(57) ABSTRACT

A disk drive is disclosed comprising a head actuated over a disk surface, the head comprising a fly height actuator for controlling a fly height of the head, and a ramp for parking the head. A ramp procedure is executed by applying a control signal to the fly height actuator to decrease the fly height and receiving a corresponding fly height signal, and detecting whether the head is on the ramp in response to the fly height signal.

18 Claims, 5 Drawing Sheets

(56) References Cited

U.S. PATENT DOCUMENTS

| | | | |
|---|---|---|---|
| 6,721,119 B1 | 4/2004 | Hassan et al. | |
| 6,721,121 B1 | 4/2004 | Schreck et al. | |
| 6,738,205 B1 | 5/2004 | Moran et al. | |
| 6,754,027 B2 | 6/2004 | Hirano et al. | |
| 6,771,480 B2 | 8/2004 | Brito | |
| 6,826,007 B1 | 11/2004 | Patton, III | |
| 6,867,944 B1 | 3/2005 | Ryan | |
| 6,902,007 B1 | 6/2005 | Orr et al. | |
| 6,917,489 B2 | 7/2005 | Lee | |
| 6,920,007 B2 | 7/2005 | Tominaga et al. | |
| 6,937,419 B2 * | 8/2005 | Suk et al. | 360/75 |
| 6,977,791 B2 | 12/2005 | Zhu et al. | |
| 7,019,932 B2 | 3/2006 | Hirano et al. | |
| 7,046,474 B2 | 5/2006 | Kuramoto et al. | |
| 7,046,475 B2 | 5/2006 | Hosokawa | |
| 7,068,459 B1 | 6/2006 | Cloke et al. | |
| 7,088,533 B1 | 8/2006 | Shepherd et al. | |
| 7,113,361 B2 | 9/2006 | Hassan | |
| 7,177,111 B2 | 2/2007 | Gururangan et al. | |
| 7,190,547 B2 | 3/2007 | Khurshudov et al. | |
| 7,199,960 B1 * | 4/2007 | Schreck et al. | 360/75 |
| 7,203,019 B1 | 4/2007 | Liu et al. | |
| 7,209,310 B1 | 4/2007 | Tsai et al. | |
| 7,215,504 B1 | 5/2007 | Bennett | |
| 7,274,527 B2 | 9/2007 | Calfee et al. | |
| 7,295,395 B2 | 11/2007 | Koh et al. | |
| 7,391,586 B2 | 6/2008 | Keast | |
| 7,486,466 B2 | 2/2009 | Hara et al. | |
| 7,502,194 B2 | 3/2009 | Alexander et al. | |
| 7,869,155 B1 | 1/2011 | Wong | |
| 2002/0071219 A1 | 6/2002 | Yoshida et al. | |
| 2002/0181139 A1 | 12/2002 | Weiehelt et al. | |
| 2004/0179289 A1 | 9/2004 | Suk et al. | |
| 2005/0152060 A1 | 7/2005 | Gururangan et al. | |
| 2005/0280916 A1 | 12/2005 | Calfee et al. | |
| 2006/0005403 A1 | 1/2006 | Calfee et al. | |
| 2007/0076317 A1 | 4/2007 | Keast | |
| 2008/0002274 A1 | 1/2008 | Allen et al. | |
| 2008/0291564 A1 | 11/2008 | Tang et al. | |
| 2010/0309574 A1 | 12/2010 | Bahirat et al. | |

OTHER PUBLICATIONS www.microesys.com/dataStorage/specifications.html, Jun. 7, 2007.
http://www.microesys.com/pdf/pa2000.pdf, "PA 2000 High Performance Positioning System for Servotrack Writers", MicroE Systems, PA2000 Rev.S1, 2 pages.

* cited by examiner

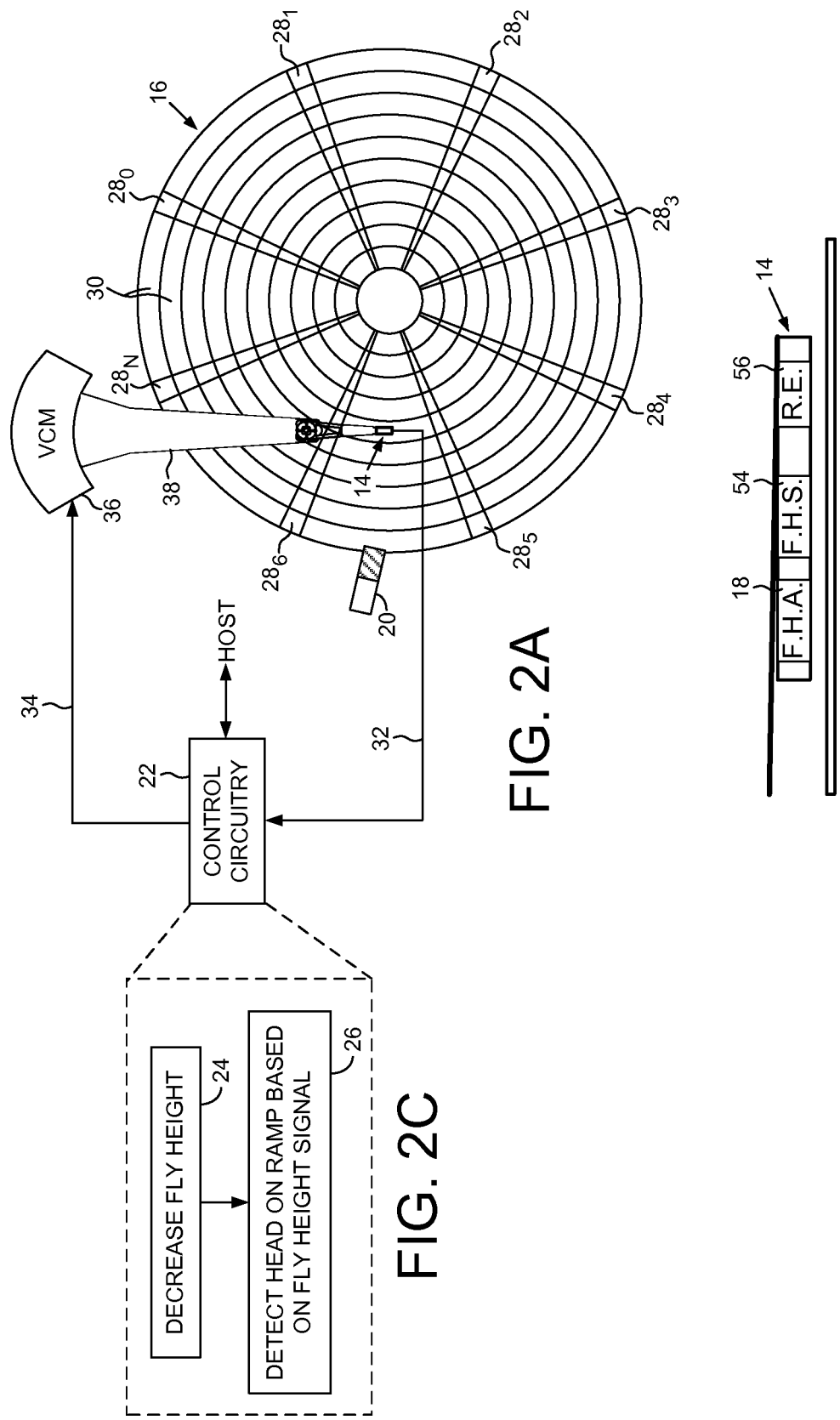

DISK DRIVE DETECTING WHEN HEAD IS ON RAMP

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

FIG. 1 shows a prior art disk format 1 as comprising a number of servo tracks 3 defined by servo sectors $5_0$-$5_N$ recorded around the circumference of each servo track. Each servo sector 5, comprises a preamble 7 for storing a periodic pattern, which allows proper gain adjustment and timing synchronization of the read signal, and a sync mark 9 for storing a special pattern used to symbol synchronize to a servo data field 11. The servo data field 11 stores coarse head positioning information, such as a servo track address, used to position the head over a target data track during a seek operation. Each servo sector 5, further comprises groups of servo bursts 13, which are recorded with precise intervals and offsets relative to the track centerlines. The servo bursts 13 provide fine head position information used for centerline tracking while accessing a data track during write/read operations.

When the disk drive is idle (not servicing host commands), the head is typically parked on a ramp located near an outer edge of the disk. The control firmware typically maintains the state of the head (parked or un-parked) so that the disk drive knows whether the head should be unloaded from the ramp before executing a new host command. However if the control firmware malfunctions when determining the state of the head, the disk drive may fail when attempting to execute a new host command.

It is also typically desirable to detect when the head first contacts the ramp during an unload operation to determine the maximum stroke of the actuator arm. For example, the location of the ramp may be determined prior to self-servo writing a disk so that the servo tracks may be written from the inner diameter of the disk to the edge of the ramp (or very near thereto), thereby maximizing the usable disk space.

BRIEF DESCRIPTION OF THE DRAWINGS

FIG. 2A shows a disk drive according to an embodiment of the present invention comprising a head actuated over a disk surface and a ramp for parking the head.

FIG. 2B shows a head according to an embodiment of the present invention comprising a fly height actuator for controlling a fly height of the head.

FIG. 2C is a flow diagram according to an embodiment of the present invention wherein after decreasing the fly height of the head whether the head is on the ramp is detected by evaluating a fly height signal.

DETAILED DESCRIPTION OF EMBODIMENTS OF THE INVENTION

Figure 1:
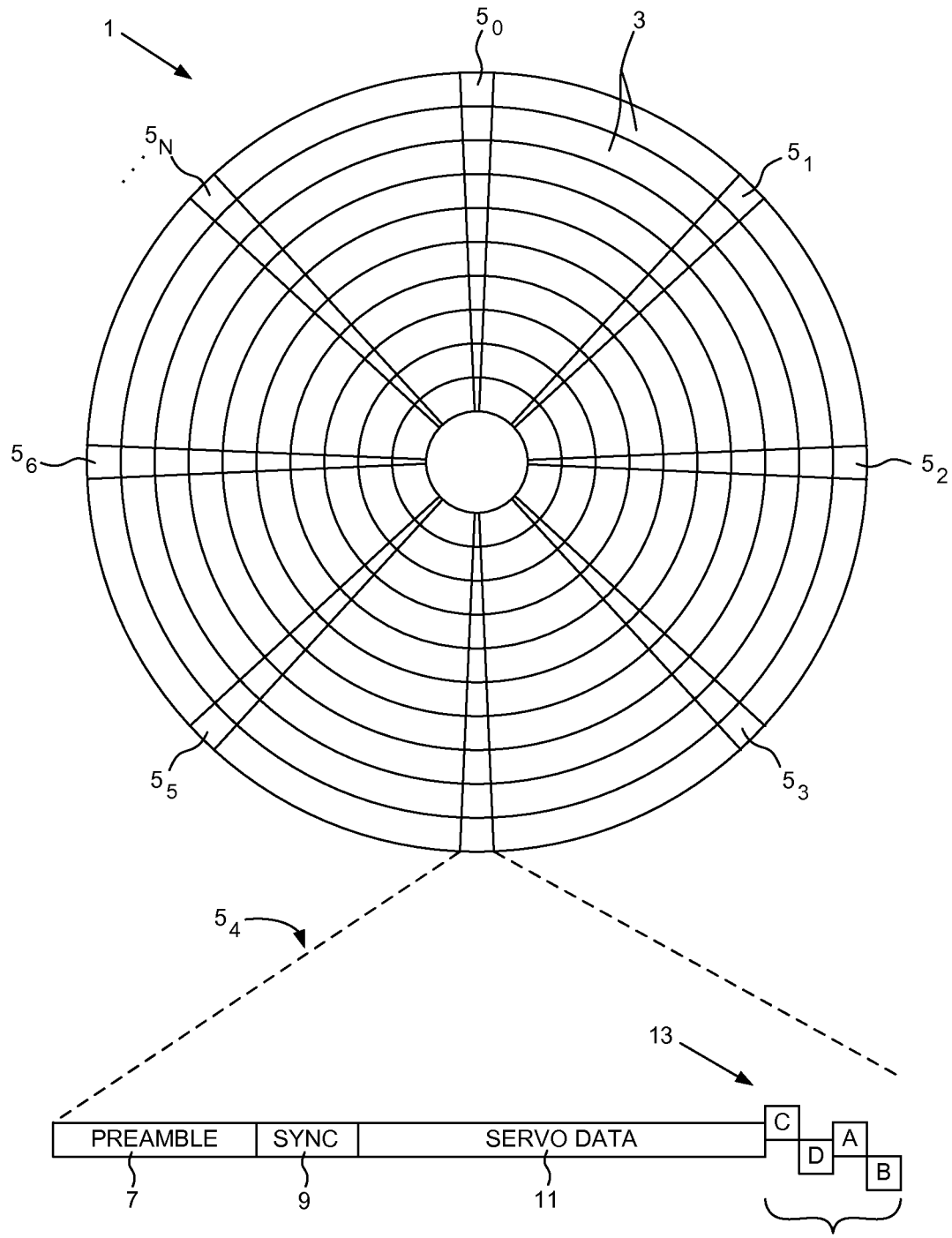
FIG. 1 shows a prior art disk format comprising a plurality of tracks defined by embedded servo sectors.

FIG. 2A shows a disk drive according to an embodiment of the present invention comprising a head 14 actuated over a disk surface 16, the head 14 comprising a fly height actuator 18 (FIG. 2B) for controlling a fly height of the head 14. The disk drive further comprises a ramp 20 for parking the head 14, and control circuitry 22 operable to execute a ramp procedure shown in FIG. 2C, wherein a control signal is applied to the fly height actuator to decrease the fly height and a corresponding fly height signal is received (step 24). Whether the head is on the ramp is detected in response to the fly height signal (step 26).

In the embodiment of FIG. 2A, the disk surface 16 comprises embedded servo sectors $28_0$-$28_N$ that define a plurality of servo tracks 30. The control circuitry 22 processes a read signal 32 emanating from the head 14 to demodulate the servo sectors $28_0$-$28_N$ and generate a position error signal (PES) representing an error between the actual position of the head and a target position relative to a target track. The control circuitry 22 filters the PES using a suitable compensation filter to generate a control signal 34 applied to a voice coil motor (VCM) 36 which rotates an actuator arm 38 about a pivot in order to actuate the head 14 radially over the disk in a direction that reduces the PES. The servo sectors $28_0$-$28_N$ may comprise any suitable position information, such as a track address for coarse positioning and servo bursts for fine positioning. The servo bursts may comprise any suitable pattern, such as the amplitude-based servo pattern shown in FIG. 1, or a suitable phase-based servo pattern. In an embodiment described below, during the ramp procedure the control circuitry 22 seeks the head 14 toward the ramp 20 by processing the servo sectors $28_0$-$28_N$, and decreases the fly height of the head as the head approaches the ramp 20. The location of the ramp 20 is then detected when the head 14 contacts the ramp 20 and the fly height signal exceeds a threshold.

In another embodiment, the control circuitry 22 executes the ramp procedure of FIG. 2C to determine whether the head is parked on the ramp 20 or flying over the disk surface 16. For example, due to a programming error the control circuitry 22 may lose track of the location of the head 14. Therefore, the control circuitry 22 decreases the fly height of the head 14 and evaluates the fly height signal to determine whether the head 14 is parked on the ramp 20. If the head 14 is parked on the ramp 20, the fly height signal will not change as the fly height decreases because the head 14 is not over the disk surface 16. If the head 14 is over the disk surface 16, the fly height signal will change as the fly height decreases.

In an alternative embodiment, the control circuitry 22 executes the ramp procedure of FIG. 2C to determine the location of the ramp 20 relative to the disk surface 16. For example, in one embodiment the disk surface 16 may be servo written with the embedded servo sectors $28_0$-$28_N$ prior to installing the disk into the disk drive. After installing the disk into the disk drive, the ramp 20 is installed with the edge extending out over the disk surface 16 by an unknown amount. The control circuitry 22 executes the ramp procedure to detect the location of the ramp 20 relative to the servo tracks 30 so that the data tracks can be defined up to the edge of the ramp in order to maximize the recording area. In an alternative embodiment, the embedded servo sectors $28_0$-$28_N$ may be self written by the control circuitry 22 after installing the disk into the disk drive. Prior to servo writing the servo sectors $28_0$-$28_N$, the control circuitry 22 executes the ramp procedure to detect the location of the ramp 20 relative to the disk surface 16. In this manner, the servo sectors $28_0$-$28_N$ can be written to define the servo tracks 30 up to the edge of the ramp in order to maximize the recording area.

Figure 3A:
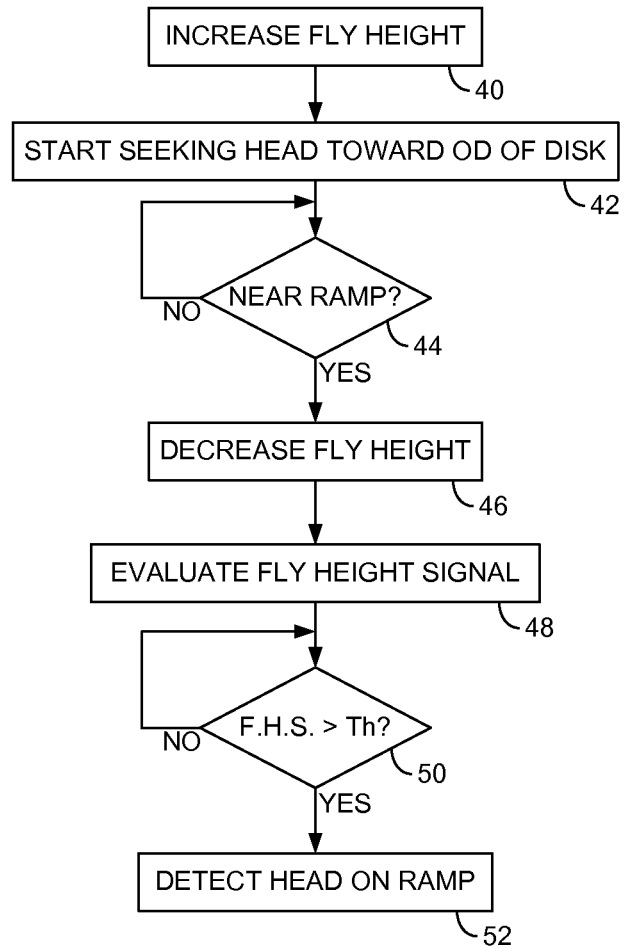
FIG. 3A is a flow diagram according to an embodiment of the present invention wherein the head is detected as on the ramp when the fly height signal exceeds a threshold.
Figure 3B:
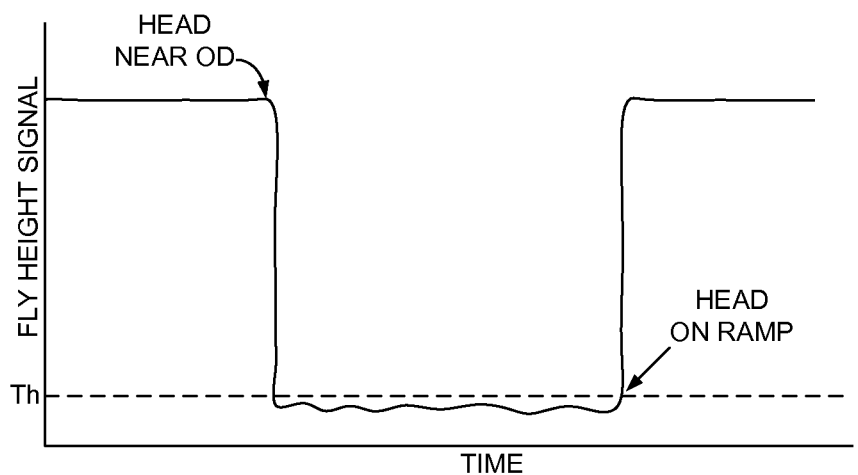
FIG. 3B shows an embodiment of the present invention wherein when seeking the head toward the ramp the fly height is deceased and the head contacting the ramp is detected when the fly height signal exceeds a threshold.

FIG. 3A is a flow diagram according to an embodiment of the present invention wherein the ramp procedure is executed to detect the location of the ramp 20 relative to the disk surface 16. The fly height of the head is increased (step 40) prior to seeking the head toward the outer diameter of the disk to avoid head disk contact during the seek operation. The seek operation is started (step 42), and when the head approaches the ramp (step 44), the fly height of the head is decreased (step 46) and the fly height signal is evaluated (step 48). When the fly height signal exceeds a threshold (step 50), the head contacting the ramp is detected (step 52). That is, as the head contacts the ramp and begins lifting away from the disk surface, the fly height signal will increase and eventually exceed a threshold as illustrated in FIG. 3B. In one embodiment, the fly height threshold is selected to account for noise in the fly height signal that may cause a false detection of the ramp.

In one embodiment, when decreasing the fly height to detect the edge of the ramp the fly height may be decreased to a level lower than a fly height used to execute one of a normal write and read operation. During normal write and read operations, the fly height may be higher to protect the head from contacting asperities on the disk, whereas during the ramp procedure the fly height may be lower in order to detect the edge of the ramp as soon as possible as the head seeks toward the ramp. Damage due to contacting asperities during the ramp procedure is less of a concern since the ramp procedure is executed infrequently (e.g., one time to detect the edge of the ramp).

In one embodiment, the embedded servo sectors may be processed in order to seek the head toward the ramp during the ramp procedure as described above. In an alternative embodiment, the disk surface 16 may be written with seed servo tracks (e.g., spiral tracks) that are processed in order to self-servo write the embedded servo sectors $28_0$-$28_N$. In this embodiment, the seed servo tracks may be processed in order to seek the head toward the ramp during the ramp procedure. In yet another embodiment, seeking the head toward the ramp may be carried out without reading any position information from the disk. In this embodiment, the head may be moved toward the ramp using an open loop control system, or using a closed loop control system wherein the back electromotive force (BEMF) voltage generated by the VCM may be processed to estimated the velocity of the head. For example, the head may be positioned at the inner diameter of the disk (using the inner diameter crash stop) and then moved toward the ramp while adjusting the velocity to substantially match a velocity profile. In one embodiment, when the head contacts the edge of the ramp the rotational angle of the disk is saved based on a clock locked to the rotation frequency of the disk. That is, the rotation angle of the disk when the head contacts the ramp represents the location of the ramp relative to the disk surface.

Any suitable technique may be employed to generate the fly height signal in the embodiment of the present invention. In one embodiment, the head 14 may comprise a suitable fly height sensor 54 (FIG. 2B), such as a suitable capacitive sensor or semiconductor sensor such as a tunneling sensor. In another embodiment, the head 14 may comprise a read element 56, such as a magnetoresistive (MR) read element, for reading data from the disk and that may also be used as a fly height sensor for generating the fly height signal. In the embodiment of FIG. 3B, the fly height signal is directly proportional to the fly height of the head, whereas in other embodiments the fly height signal may be inversely proportional to the fly height of the head (i.e., the fly height signal may increase as the fly height decreases). In this embodiment, the fly height signal may be inverted prior to comparing it to a threshold (step 50 of FIG. 3A), or the comparison may be inverted (i.e., detect the ramp when the fly height signal falls below a threshold).

Figure 4:
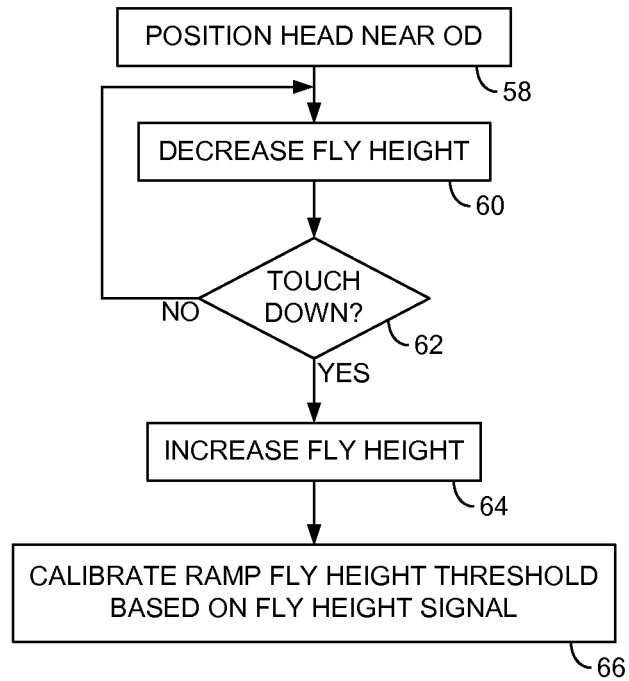
FIG. 4 is a flow diagram according to an embodiment of the present invention wherein a ramp detection fly height threshold is calibrated by performing a touchdown calibration.

FIG. 4 shows a flow diagram according to an embodiment of the present invention for calibrating the fly height threshold used to detect whether the head is on the ramp. The head is positioned near the outer diameter of the disk (step 58) and then a touchdown procedure is executed wherein the fly height of the head is decreased (step 60) until the head touching down on the disk is detected (step 62). The fly height of the head is then increased from the touchdown level by a predetermined margin (step 64). The fly height signal is then evaluated in order to calibrate the fly height threshold used to detect whether the head is on the ramp. For example, a statistical analysis of the fly height signal (e.g., mean, variance, etc.) may be computed to establish the fly height threshold.

Figure 5:
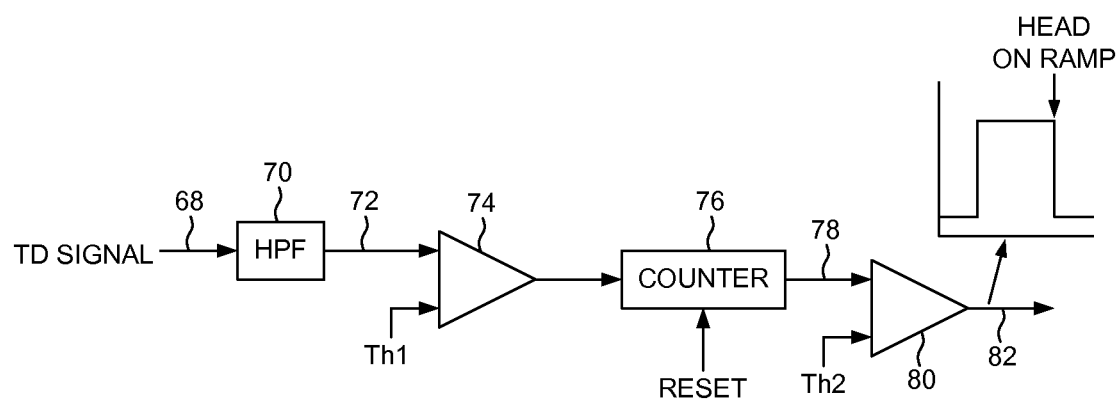
FIG. 5 shows control circuitry according to an embodiment of the present invention for detecting a head touchdown event.

FIG. 5 shows control circuitry for detecting the head touchdown according to an embodiment of the present invention. A touchdown sensor generates a touchdown signal 68 that is highpass filtered 70 (or alternatively bandpass filtered), and the filtered signal 72 compared 74 to a first threshold Th1. When the filtered signal 72 exceeds the threshold Th1 a counter 76 is incremented, and when the output 78 of the counter 76 exceeds a second threshold Th2 at comparator 80, a touchdown event is detected. The counter 76 is reset periodically such that the touchdown event is detected when the filtered touchdown signal 72 exceeds the first threshold Th1 for a corresponding percentage of a detection window.

In one embodiment, the touchdown detection circuitry of FIG. 5 is also used to detect when the head is on the ramp. That is, the touchdown signal 82 output by the comparator 80 represents the fly height signal at step 26 of FIG. 2C for detecting whether the head is on the ramp. After decreasing the fly height of the head while seeking the head toward the ramp, the ramp is detected when the touchdown signal 82 toggles from high to low as illustrated in FIG. 5. Alternatively, when detecting whether the head is parked on the ramp or over the disk, the fly height is decreased and the touchdown signal 82 evaluated (where a high state indicates the head is over the disk). When calibrating the fly height threshold, either the first threshold Th1 or the second threshold Th2 or both thresholds of FIG. 5 may be adjusted at step 66 of FIG. 4.

Figure 6A:
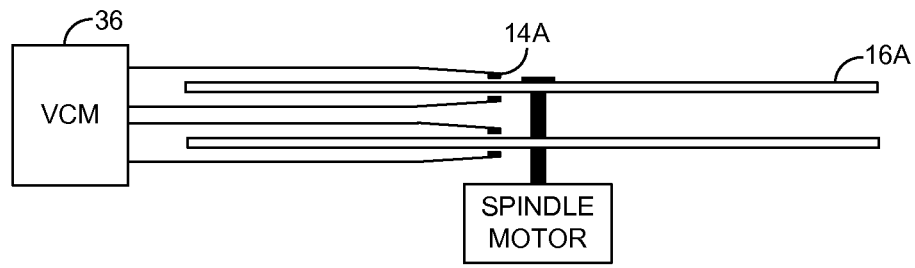
FIG. 6A shows an embodiment of the present invention wherein the disk drive comprises a plurality of heads actuated over respective disk surfaces.
Figure 6B:
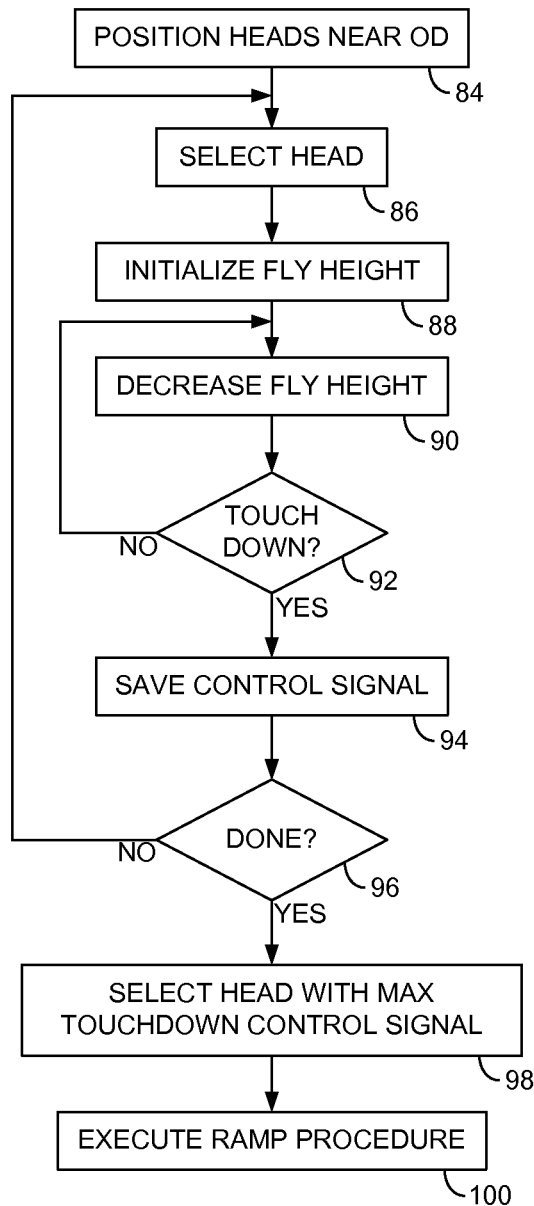
FIG. 6B is a flow diagram according to an embodiment of the present invention wherein a touchdown calibration is executed for each head, and then the head having the maximum touchdown control signal is selected to execute the ramp procedure.

FIG. 6A shows an embodiment of the present invention wherein the disk drive comprises a plurality of disk surfaces (e.g., disk surface 16A) and a head actuated over each disk surface (e.g., head 14A). In one embodiment, the ramp procedure of FIG. 2C may be executed for each head in order to detect the ramp location relative to each disk surface. In another embodiment, the ramp procedure is executed for only one of the heads, wherein FIG. 6B is a flow diagram according to an embodiment of the present invention for selecting the head to execute the ramp procedure.

The heads are positioned near the outer diameter of the disk (step 84), and then the touchdown calibration is executed for each head. A first head is selected (step 86) and its fly height initialized (step 88). The fly height is then decreased (step 90) by increasing the fly height control signal applied to the fly height actuator until the touchdown event is detected (step 92). The touchdown value for the fly height control signal that caused the touchdown event is saved (step 94) and the process is repeated for the next head (step 96) until the touchdown value for the fly height control signal has been determined for each head. The head having the maximum touchdown value is then selected (step 98) for executing the ramp procedure (step 100).

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk surface;
   a head actuated over the disk surface, the head comprising a fly height actuator for controlling a fly height of the head;
   a ramp for parking the head; and
   control circuitry operable to execute a ramp procedure by:
      applying a control signal to the fly height actuator to decrease the fly height and receiving a corresponding fly height signal;
      seeking the head toward the outer diameter of the disk surface; and
      detecting when the head contacts the ramp in response to the fly height signal.

2. The disk drive as recited in claim 1, wherein the head comprises a fly height sensor operable to generate the fly height signal.

3. The disk drive as recited in claim 1, wherein the head comprises a read element operable to read data from the disk and operable to generate the fly height signal.

4. The disk drive as recited in claim 1, wherein the control circuitry is further operable to decrease the fly height of the head as the head approaches the ramp during the seek.

5. The disk drive as recited in claim 4, wherein the control circuitry is further operable to decrease the fly height of the head to a level lower than a fly height used to execute one of a normal write and read operation.

6. The disk drive as recited in claim 1, wherein the control circuitry is further operable to detect when the head contacts the ramp when the fly height signal indicates the fly height exceeds a fly height threshold.

7. The disk drive as recited in claim 6, wherein the control circuitry is further operable to:
   calibrate a touchdown value for the control signal that causes the head to contact the disk surface; and
   adjust the control signal to be substantially less than the touchdown value and calibrate the fly height threshold in response to the fly height signal.

8. The disk drive as recited in claim 1, wherein:
   the disk drive comprises a plurality of disk surfaces and a plurality of heads;
   the control circuitry is further operable to:
   calibrate a touchdown value for the control signal that causes each head to contact the respective disk surface; and
   execute the ramp procedure using the head having the maximum touchdown value.

9. A method of operating a disk drive, the disk drive comprising a disk surface, a head actuated over the disk surface, the head comprising a fly height actuator for controlling a fly height of the head, a ramp for parking the head, the method comprising:
   applying a control signal to the fly height actuator to decrease the fly height and receiving a corresponding fly height signal;
   seeking the head toward the outer diameter of the disk surface; and
   detecting when the head contacts the ramp in response to the fly height signal.

10. The method as recited in claim 9, wherein the head comprises a fly height sensor operable to generate the fly height signal.

11. The method as recited in claim 9, wherein the head comprises a read element operable to read data from the disk and operable to generate the fly height signal.

12. The method as recited in claim 9, further comprising decreasing the fly height of the head as the head approaches the ramp during the seek.

13. The method as recited in claim 12, further comprising decreasing the fly height of the head to a level lower than a fly height used to execute one of a normal write and read operation.

14. The method as recited in claim 9, further comprising detecting when the head contacts the ramp when the fly height signal indicates the fly height exceeds a fly height threshold.

15. The method as recited in claim 14, further comprising:
   calibrating a touchdown value for the control signal that causes the head to contact the disk surface; and
   adjusting the control signal to be substantially less than the touchdown value and calibrate the fly height threshold in response to the fly height signal.

16. The method as recited in claim 9, wherein:
   the disk drive comprises a plurality of disk surfaces and a plurality of heads;
   the method further comprises:

calibrating a touchdown value for the control signal that causes each head to contact the respective disk surface; and executing the ramp procedure using the head having the maximum touchdown value.

17. A disk drive comprising:

a plurality of disk surfaces;

a head actuated over each disk surface, the head comprising a fly height actuator for controlling a fly height of the head in response to a control signal;

a ramp for parking the heads; and control circuitry operable to:

calibrate a touchdown value for the control signal that causes each head to contact the respective disk surface; and execute a ramp procedure using the head having the maximum touchdown value by:

applying the control signal to the fly height actuator to decrease the fly height and receiving a corresponding fly height signal; and detecting whether the head is on the ramp in response to the fly height signal.

18. A method of operating a disk drive, the method comprising:

calibrating a touchdown value for a control signal of a fly height actuator that causes each of a plurality of heads to contact a respective disk surface; and executing a ramp procedure using the head having the maximum touchdown value by:

applying the control signal to the fly height actuator to decrease the fly height of the head and receiving a corresponding fly height signal; and detecting whether the head is on the ramp in response to the fly height signal.

* * * * *